United States Patent
Adams et al.

(10) Patent No.: US 7,478,054 B1
(45) Date of Patent: Jan. 13, 2009

(54) SHARING INFORMATION ABOUT PURCHASES

(75) Inventors: Warren Adams, Edgartown, MA (US); Jeffrey P. Bezos, Greater Seattle, WA (US); Jennifer Jacobi, Seattle, WA (US); Ryan Snodgrass, Kirkland, WA (US)

(73) Assignee: Amazon.com, Inc., Seattle, WA (US)

( * ) Notice: Subject to any disclaimer, the term of this patent is extended or adjusted under 35 U.S.C. 154(b) by 779 days.

(21) Appl. No.: 09/718,445

(22) Filed: Nov. 20, 2000

Related U.S. Application Data (63) Continuation-in-part of application No. 09/715,850, filed on Nov. 17, 2000, now Pat. No. 7,433,832.

(60) Provisional application No. 60/166,664, filed on Nov. 19, 1999.

(51) Int. Cl.
*G06Q 30/00* (2006.01)

(52) U.S. Cl. .......................... 705/26; 705/27
(58) Field of Classification Search .................. 705/26, 705/27
See application file for complete search history.

(56) References Cited

U.S. PATENT DOCUMENTS

| 4,992,940 | A | * | 2/1991 | Dworkin ..................... 705/26 |
| 5,796,395 | A |   | 8/1998 | de Hond |
| 5,884,282 | A | * | 3/1999 | Robinson ..................... 705/27 |
| 5,913,032 | A | * | 6/1999 | Schwartz et al. ............ 709/213 |
| 5,918,014 | A | * | 6/1999 | Robinson ..................... 707/10 |
| 5,974,396 | A |   | 10/1999 | Anderson et al. |
| 6,029,141 | A |   | 2/2000 | Bezos et al. |
| 6,041,311 | A |   | 3/2000 | Chislenko et al. |
| 6,092,049 | A | * | 7/2000 | Chislenko et al. ............. 705/10 |
| 6,175,831 | B1 |   | 1/2001 | Weinreich et al. |
| 6,249,773 | B1 |   | 6/2001 | Allard et al. |
| 6,269,369 | B1 |   | 7/2001 | Robertson |
| 6,317,722 | B1 | * | 11/2001 | Jacobi et al. .................. 705/14 |
| 6,321,221 | B1 |   | 11/2001 | Bieganski |
| 6,343,273 | B1 | * | 1/2002 | Nahan et al. ................... 705/5 |
| 6,460,036 | B1 |   | 10/2002 | Herz |
| 6,473,738 | B1 | * | 10/2002 | Garrett ........................ 705/26 |
| 6,525,747 | B1 |   | 2/2003 | Bezos |
| 6,598,026 | B1 |   | 7/2003 | Ojha et al. |
| 6,609,106 | B1 | * | 8/2003 | Robertson .................... 705/26 |
| 6,611,814 | B1 | * | 8/2003 | Lee et al. ..................... 705/26 |
| 6,925,444 | B1 |   | 8/2005 | McCollom et al. |
| 7,082,407 | B1 |   | 7/2006 | Bezos et al. |
| 2002/0023132 | A1 | * | 2/2002 | Tornabene et al. .......... 709/205 |
| 2002/0042775 | A1 | * | 4/2002 | Nelson et al. ................. 705/39 |

(Continued)

OTHER PUBLICATIONS

"MyGiftList.com Announces Launch of Online Gift Registry" Dec. 1999, Business Wire.*

(Continued)

*Primary Examiner*—F. Zeender
*Assistant Examiner*—Christopher Buchanan
(74) *Attorney, Agent, or Firm*—Knobbe, Martens, Olson & Bear LLP (57) ABSTRACT

A facility for notifying a first user about a purchase made by a second user is described. The facility detects that the second user has purchased an item. The facility further determines that the first user has a purchase notification relationship with the second user. The facility then provides to the first user a notification that the second user has purchased the item.

20 Claims, 9 Drawing Sheets

U.S. PATENT DOCUMENTS

| | | | | |
|---|---|---|---|---|
| 2002/0095298 | A1* | 7/2002 | Ewing | 705/1 |
| 2003/0074265 | A1* | 4/2003 | Oshima | 705/26 |
| 2004/0172588 | A1* | 9/2004 | Mattaway | 715/500.1 |
| 2005/0021423 | A1* | 1/2005 | Nahan et al. | 705/27 |

OTHER PUBLICATIONS

U.S. Appl. No. 09/715,929, Bezos et al.

Delphi.com: "Delphi-Forums—Now Leading Provider of Personal Communities; Registered Membership Reaches Half-Million Milestone," Business Wire, Aug. 17, 1998 (1 page) http://proquest.umi.com/pqdweb?index=18&did=000000033159980&SrchMode=1&sid=2&.

Delphi.com, "Talk Amongst Yourselves in a Free Web Forum," PC World, San Francisco, Sep. 1998, vol. 16, Issue 9, p. 250.

"PlanetAll Keeps Online Masses Organized," PC World Online, San Francisco, Aug. 14, 1998, p. 1.

"Amazon.com Buys Junglee and PlanetAll:[1]," PC World Online, San Francisco, Aug. 5, 1998, p. 1.

"PlanetAll, Who Should Join?" (1 page) http://web.archive.org/web/19971114081105/www.planetall.com/newmain/new.main.dbm?f (Mar. 16, 2008].

U.S. Appl. No. 09/715,850, Bezos.

D. Willmott, "Deja View," PC Magazine Online, dated May 26, 1999 (2 pages).

M. Rafter, "10 Companies to Watch: Epinions.Com," The Industry Standard Magazine, dated Jan. 17, 2000 (3 pages printed from TheStandard.com web site).

D. Willmott, "epinions.com," PC Magazine, dated Sep. 10, 1999 (2 pages printed from zdnet.com web site).

A. Barrett, "What's Your Epinion?", PC World, Sep. 13, 1999 (2 pages printed from PCWORLD.COM Web Site).

C. Kirby, "Everyone's A Critic—Web sites Hope online reviews of products lead to online buying," San Francisco Chronicle, Jan. 22, 2000 (3 pages printed from sfgate.com web site).

PlanetAll; Cardwell, Annette; "Cyberscene PlanetAll Keeps You in Touch," Boston Herald, Dec. 6, 1996, Proquest #17350285.

W. Andrews, "Building Communities As Way of Building Sales," Web Week, vol. 2, Issue 20, Dec. 16, 1996 (2 pages).

M. Roscheisen, C. Mogensen and T. Winograd, "Beyond browsing: shared comments, SOAPS, trails, and on-line communities," Computer Networks and ISDN Systems, Proceedings of the Third International World-Wide Web Conference, pp. 739-749, dated Apr. 1995.

PlanetAll: Internet Archive Wayback Machine, www.archive.org; www.planetall.com; Nov. 14, 1997, 19 pgs.

UU: Carroll, Matt: "Can't Keep Track of Your Friends? A Cambridge Firm Will," Boston Globe, Jan. 4, 1998, Proquest #25464125.

Abstract: "Just Add People—Collaborative filtering brings human input to information retrieval in the enterprise".

Watt, Peggy; Internet Article; "Varied Collaborative Approaches Entice Intranet Users," Network World, Apr. 21, 1997; Proquest #11525439.

PhotoNet: Heid, Jim; "Personal Technology: With Online Finishing, Family Photos Re a Click Away," Los Angeles Times, Jun. 29, 1998, Proquest #30824463, 5 pgs.

Epinions.com, www.epinions.com, Dec. 4, 1999 [retrieved May 17, 2004], pp. 1021, retrieved from: Google.com and archive.org.

PlanetAll: "PlanetAll Internet Community Personalized the Web with Hot New Features and a Fresh Look," PR Newswire, Sep. 30, 1997, Dialog file #1160053, 4 pgs.

U.S. Appl. No. 09/715,850, filed Nov. 17, 2000.

* cited by examiner

Fig. 1 amazon.com.

200

| YOUR ACCOUNT | HELP

WELCOME | DIRECTORY | BOOKS | MUSIC | TOYS & VIDEO GAMES | ELECTRONICS | NEW CARS
HOW TO ORDER | GIFT IDEAS | TOP SELLERS | FRIENDS & FAVORITES | FREE E-CARDS

Search People: All ▼      Your Favorite People: Select ▼

Friends & Favorites > About jj > Shared Purchases jj's Shared Purchases

Name: Jennifer
Nickname: jj
E-mail: jj@saturn.net    210
Location: Seattle, WA
Reviewer Rank: 11639
About me: Grew up in Arizona...then central valley in...see more

Sort by Last Updated ▼       1-10 of 57 | next

MORE TO EXPLORE
At a glance
Reviews written: 2
(49 helpful votes)
Shared purchases: 57
Wish List: 3 of 27 items purchased
Favorite People: 61 jj is a Trusted Friend

211 → Philips TiVo HDR312 Personal TV Receiver
by Philips                    212

Our Price:   Add to Cart
$399.99         Add to Wish List
                              213
Rebate: Your price is $299.99 after the manufacturer's mail-in rebate of $100.00. Click here to view and print the manufacturer's rebate coupon.
More about mail-in rebates
Usually ships in 24 hours
Media: Electronics Last updated July 18, 2000

Favorite People:
- agrodnik
- Alex Edelman
- AlexY
- Andrew Harbick
- Andrew Nicholson
- Barb Nicholson
- Beanish
- Becky Sundling Klippert
- Benjamin W. Slivka
- Bob Vadnais
- Brent R. Smith        220
- Brewster Kahle
- Brian Kennealy
- Bruce K. Jones
- Carl Lim
- Daniel Shader
- David Slade
- Dwayne Bowman
- Eric Benson
- Erik Neumann

Graphic Java 2, Mastering the JFC: AWT, Volume 1
by David M. Geary

List Price: $49.99   Add to Cart
Our Price:       Add to Wish List
$39.99
You Save: $10.00

FIG. 2

Ceiva Internet-Enabled Photo Frame
by Ceiva

List Price: $295.99
Our Price: $284.99
You Save:$11.00 (4%)
Usually ships in 24 hours
Media: Electronics Last updated July 3, 2000

310

It's Not About the Bike : My Journey Back to Life
by Lance Armstrong, Sally Jenkins (Contributor)

List Price: $24.95
Our Price: $14.97
You Save:$9.98 (40%)
Usually ships in 24 hours
Putnam Pub Group
Hardcover - 288 pages
(May 18, 2000)

320 jj's Rating and Comments: Last updated June 12, 2000
★★★★★ — 324
AWESOME story. This is a must read biography.

325

Polaroid I-Zone Silver Edition Pocket Camera Kit
by Polaroid

List Price: $24.99
Our Price: $19.99
You Save:$5.00 (20%)
Usually ships in 24 hours
Media: Electronics

Friends & Favorites > Your About You Area

This is your About You area. Have fun with it. To get started, fill in your nickname and e-mail address. Then work your way down the page, adding your ideas and personality along the way. (By the way, nothing you write is set in stone--you can change this page as often as you want.)

Your personal info: Edit
Viewable by the public:
Name: steve

Nickname: *srv*
Tell a little about yourself--in 4,000 characters or less. Click here to write your personal description.

| Add an image here. It's easy! | MORE TO EXPLORE At a glance Shared purchases: 0 (Trusted Friends only) Favorite People: 1 |

Your picture:
Edit

People with new activity — 410
 ii — 411

All Favorite People
 ii
 = Trusted Friend
Favorite People list Edit

Add Trusted Friends

E-mail this page to a friend

Your Reviews, Requests & Recommendations
Write a review
The reviews you write say a lot about the person you are. That's why each time you write a product review at Amazon.com, it'll also be featured here on your About You area.

Share your Amazon.com purchases
Show a new side of yourself to the people you trust. Share your Amazon.com purchases with your Trusted Friends. You'll find out things you never knew about other folks, and they'll get to know your personal interests, passions and hobbies.

Your Wish List  Edit
All Wish List items have been bought for you. Add more items to your Wish List so people will buy you more stuff you want!

Share your Favorite Areas  Edit
Your Favorite Areas are not only great for navigation and personalization, but also handy for gift ideas. Share your favorite areas and your friends will be able to browse through the things that interest you most.

FIG 4 — 400 amazon.com.

VIEW CART | WISH LIST | YOUR ACCOUNT | HELP

WELCOME | STORE DIRECTORY | ELECTRONICS | MUSIC | BOOKS | HEALTH & BEAUTY | SOFTWARE | ELECTRONICS

ADVANCED SEARCH | BROWSE CATEGORIES | INFO CENTER | TOP SELLERS | CAMERA & PHOTO | GIFT IDEAS

SEARCH
Electronics ▼
GO!

ITEM INFORMATION
Explore this item
 buying info
 technical data
 editorial reviews
 customer reviews
See more by this manufacturer
 Philips
Discover similar items
 In electronics
Customers also bought
 these other items...
Share your thoughts
 write a review
 check purchase circles
 e-mail a friend about this item

Already Own It? Rate It!

To improve your recommendations, rate this product:

◉ Not Rated
○
○

Philips TiVo HDR312 Personal TV Receiver
Other products by Philips

List Price: $499.95
Our Price: $399.99
You Save: $99.96 (20%)

Rebate: Your price is $299.99 after the manufacturer's mail-in rebate of $100.00. Click here to view and print the manufacturer's rebate coupon. More about mail-in rebates
Availability: Usually ships within 24 hours.

Enjoy free shipping for orders over $100!

See more pictures | Technical data

Compare with top sellers in this category. Quick Compare

Avg. Customer Review: ★★★★☆. Number of Reviews: 126
Amazon.com Sales Rank: 190

☞ These friends have purchased this item: jj

Features:
- Free movie tickets with purchase through 14 November 2000; see rebate for details
- Up to 30 hours of storage capacity
- 8-second instant replay feature
- Pause, fast-forward, and rewind
- Jump-to-live button on remote
  ▸ See more technical details

Shipping: Currently, item can be shipped only within the U.S.
Shipping weight: 22.0 pounds.

BUY FROM AMAZON.COM

Add to Shopping Cart
(you can always remove it later)

Use the shopping cart if you're redeeming a gift certificate

Buy now with 1-Click®
(you can always cancel it later)

Ship to:
steve lawr- 98101 ▼

☐ Add gift wrap or note
Review or change your 1-Click addresses

Add to Wish List (We'll set one up for you)
View my Wish List

— 510
— 511
500

FIG 5 http://www.amazon.com/exec/obidos/ASIN/B00002SWHH/o/qid=.../103-9261850-148224  11/13/2000

FIG. 6 amazon.com

Thank you for your 1-Click order!

One copy of: *Original Musiquarium: Greatest Hits* — 601 steve

Will be sent to:

seattle WA

Review or edit your 1-Click orders (You'll see all items consolidated in this order.)

Continue 1-Click shopping! If you 1-Click other items within the next 90 minutes, we'll minimize your shipping costs by combining items into as few shipments as possible.

Share this item with your Trusted Friends, and we'll add it to your list of Shared Purchases. Share — 602

Other items you might enjoy:

Earth Wind & Fire - Greatest Hits [ORIGINAL RECORDING REMASTERED]
~ Earth Wind & Fire

Average Customer Rating:

List Price: $17.97
Our Price: $13.99
You Save: $3.98 (22%)
Read More

Greatest Hits
~ Quincy Jones

Average Customer Rating:

List Price: $17.97
Our Price: $13.99
You Save: $3.98 (22%)
Read More

The Woman In Red: Selections From The Original Motion Picture Soundtrack [SOUNDTRACK]
~ Stevie Wonder

Average Customer Rating:

Our Price: $11.97
Read More

Jungle Fever: Music From The Movie [SOUNDTRACK]
~ Stevie Wonder

600

Al Green - Greatest Hits
~ Al Green

Off The Wall
~ Michael Jackson

FIG. 8 amazon.com.

VIEW CART | WISH LIST | YOUR ACCOUNT | HELP

WELCOME | STORE DIRECTORY

BOOKS  MUSIC  ELECTRONICS  NEW CARS  TOYS & GAMES

▶ INTERNATIONAL  ▶ TOP SELLERS  ▶ FRIENDS & FAVORITES  ▶ FREE E-CARDS  ▶ PLAYSTATION2

Search People: [All ▼] [          ]          Your Favorite People: [Select ▼]

Friends & Favorites > Your About You Area > Friends Bestsellers

Your personal info: Edit

Viewable by the public:
Name: Ryan Snodgrass
Nickname: ferrari
Reviewer Rank: 922

Viewable by Trusted Friends only:
E-mail: ryans@amazon.com

Your personal description: Edit

Viewable by the public:
About me: North Buncombe High School, Carnegie Mellon... see more MORE TO EXPLORE
At a glance
Reviews written: 16 (220 helpful votes)
Shared purchases: 197
Wish List: 3 of 106 items purchased
Favorite People: 180
Friends Bestsellers
Favorite Item Lists: 6

Your picture: Edit

TOP 1000 Reviewer

Auctions

Friends Bestsellers List

Friends that have purchased this item: 18  — 911

🎬 The Matrix DVD
~ Keanu Reeves

List Price: $24.98
Our Price: $16.74
You Save: $8.24 (33%)
Usually ships in 24 hours
Rated R
Region 1 encoding (US and Canada only)

Add to cart
Add to Wish List

} 910

Friends that have purchased this item: 17 — 921

📕 Programming Perl (2nd Edition)
by Larry Wall, et al

Our Price: $44.95
Usually ships in 24 hours
O'Reilly & Associates
Paperback - 645 pages
2nd edition (October 1996)

Add to cart
Add to Wish List

} 920

Friends that have purchased this item: 9 — 931

🎯 Nerf Action: Wild Fire
by Hasbro

List Price: $29.99
Our Price: $24.99
You Save: $5.00 (17%)
Usually ships in 24 hours
Amazon.com recommended age: 6 years and up
Toysrus.com selection.
Delivered by Amazon.com Add to cart
Add to Wish List

SHARING INFORMATION ABOUT PURCHASES

CROSS-REFERENCE TO RELATED APPLICATION(S)

This application is a continuation-in-part of U.S. patent application Ser. No. 09/715,850 entitled "METHODS AND SYSTEMS FOR DISTRIBUTION INFORMATION WITHIN A DYNAMICALLY DEFINED COMMUNITY," filed Nov. 17, 2000, which application claims the benefit of U.S. Provisional Application No. 60/166,664 entitled "WEB-BASED METHODS FOR ENABLING CUSTOMERS TO SHARE INFORMATION ABOUT PURCHASES," filed Nov. 19, 1999, which applications are hereby incorporated by reference in their entireties.

TECHNICAL FIELD

The present invention is directed to the field of shopping information systems.

BACKGROUND

The World Wide Web ("the Web") is a system for publishing information, in which users may use a Web browser application to retrieve information, such as Web pages, from Web servers and display it. Search engines, subject indices, and links between Web pages and Web sites facilitate the exploration of information published on the Web.

The Web has increasingly become a medium used to shop for products. Indeed, thousands and thousands of different products may be purchased on the Web. A user who plans to purchase a product on the Web can visit the Web site of a Web merchant that sells the product, view information about the product, give an instruction to purchase the product, and provide information needed to complete the purchase, such as payment and shipping information.

Like other types of merchants, Web merchants generate revenue and profits by selling products to customers. Thus, aspects of a Web merchant's Web site that directly facilitate the sale of products contribute to the Web merchant's level of profitability. For instance, the one-click purchase system developed by Amazon.com, by making it easier for customers to complete their purchase of products, contributes to the level of profitability of Web merchants employing this system.

In addition to aspects of a Web merchant's Web site that directly facilitate the sale of products, other aspects of a Web merchant's Web site may also contribute to the Web merchant's level of profitability. Principal among these other aspects of a Web merchant's Web site are aspects that motivate more customers and potential customers (hereafter "users") to visit the Web merchant's Web site more often, and to "remain" there, viewing content, for longer periods of time. The extent to which a Web site motivates users in this way is sometimes referred to as the Web site's level of "stickiness."

A Web merchant that has a particularly sticky Web site is often able to improve profitability in a number of ways. First, because more users visit the Web site more frequently and remain longer, the Web merchant has more opportunities to sell products to users, and ultimately sells more products to users. Second, if the Web merchant elects to display advertisements on its Web site, the level of revenue realized from such advertising increases as traffic on the Web merchant's Web site increases. Third, if the Web merchant elects to enter into referral or traffic sharing agreements with other Web sites, a high level of traffic on the Web merchant's Web site can increase the revenue derived from these agreements, or at least reduce the cost of these agreements. Fourth, to the extent that the Web site can encourage users to contribute content to the Web site, such user-contributed contents can make the Web site still stickier, reinforcing the other ways in which stickiness contributes to profitability. Thus, any aspects of a Web merchant's Web site that increase the stickiness of the Web page can improve profitability for the Web merchant.

One reason attributed to the somewhat low rate at which users have accepted shopping on the Web is that, while shopping on the Web usually satisfies the utilitarian purpose that most people have for shopping at physical stores, shopping on the Web generally falls short of fulfilling the "entertainment" or "shared activity" purposes that many people also have for shopping at physicals stores. Accordingly, a new feature of a Web merchant Web site that helped to fulfill these "entertainment" and "shared activity" purposes of shopping, particularly one that increased the level of stickiness of the Web site, would have significant utility.

DETAILED DESCRIPTION

A purchase sharing software facility enables users, referred to as "sharing users," to selectively share information about their purchases with other users. At various points, the facility enables a sharing user to select for sharing products that the sharing user has purchased. For example, the sharing user may select a product for sharing at the time the product is purchased, or at a later time.

The user may optionally select or define a group of users with which information about the selected purchase will be shared. The user may also choose to share information about the selected purchase with all users, or to share different amounts of information about the selected purchase with different groups of users, or to share information about different groups of users in different contexts.

The sharing user may also optionally add information to the information that is shared for a particular shared purchase. For example, the sharing user may add a rating of the purchased product, or a review or other discussion of the product.

After a sharing user has selected a purchase for sharing, information about the purchase is provided to any users that are in the group or groups of users designated by the sharing user to receive it. Providing such information is in some cases referred to as notifying the users to whom the information is provided. For example, when a user in this group visits a web page containing a description of the purchased product, the facility may display a visual indication that the sharing user purchased the product. The indication may either be accompanied by additional details about the sharing user's purchase of the product, or may include a link to additional details. Additional details may include the date on which the sharing user purchased the product and the sharing user's feedback on the product. Information about the shared purchase may also be provided to users in the designated group when they visit a page containing information about the sharing user, or may be transmitted to those users in messages of various types. In addition to the additional details mentioned above, the information about the purchase displayed on this page may also include information about the product, including its name, a description, an image, and controls for purchasing the product or adding it to a wish list.

In some embodiments, the facility provides a "friends best sellers list" to users. The friends best sellers list identifies products purchased by one or more users that have a purchase information sharing relationship with the current user. In certain embodiments, the friends best seller list is sorted in decreasing order of the number of other users having the purchase information sharing relationship that purchased each product.

By facilitating the sharing of purchase information in this manner, the facility adds to the online shopping model a sense of "entertainment" or "shared activity" typically missing from online shopping. In the process, it both directly facilitates the sale of products, and indirectly contributes to the Web merchant's level of profitability by significantly increasing the stickiness level of the Web merchant Web site.

Figure 1:
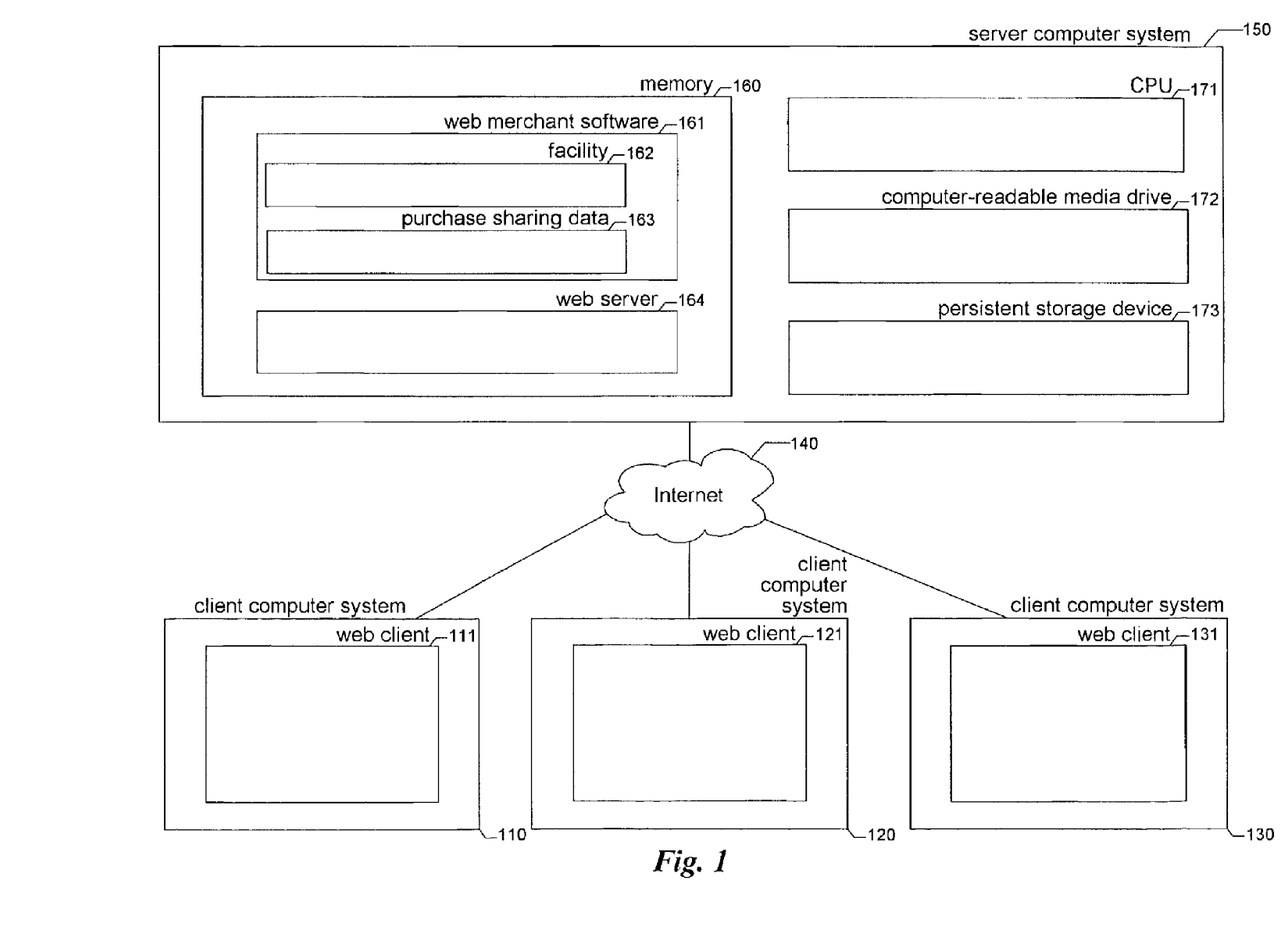
FIG. 1 is a high-level block diagram showing the environment in which the facility typically operates.

FIG. 1 is a high-level block diagram showing the environment in which the facility typically operates. The block diagram shows several client computer systems, such as client computer systems 110, 120, and 130. Each of the client computer systems has a Web client computer program for browsing the World Wide Web, such as Web clients 111, 121, and 131. The client computer systems are connected via the Internet 140 to a server computer system 150 hosting the facility. Those skilled in the art will recognize that client computer systems could be connected to the server computer system by networks other than the Internet, however.

The server computer system 150 contains a memory 160. The memory 160 preferably contains merchant software 161 incorporating both the facility 162 and purchase sharing data 163 preferably used by the facility.

The memory preferably further contains a Web server computer program 164 for delivering Web pages in response to requests from Web clients. While items 161-164 are preferably stored in memory while being used, those skilled in the art will appreciate that these items, or portions of them, maybe be transferred between memory and a persistent storage device 172 for purposes of memory management and data integrity. The server computer system further contains one or more central processing units (CPU) 171 for executing programs, such as programs 161-164, and a computer-readable medium drive 173 for reading information or installing programs such as the facility from computer-readable media, such as a floppy disk, a CD-ROM, or a DVD.

While preferred embodiments are described in terms in the environment described above, those skilled in the art will appreciate that the facility may be implemented in a variety of other environments including a single, monolithic computer system, as well as various other combinations of computer systems or similar devices connected in various ways.

In order to more effectively describe the implementation and operation of the facility, it is hereafter discussed in the context of an example. Aspects of the example are shown in FIGS. 2-7. Various components of the facility are described below. Those of ordinary skill in the art will recognize that components of the facility may be grouped in various ways in different embodiments of the facility. For example, a software component of the facility that detects that a purchasing customer has purchased an item may be executed by the hardware of the facility, such as the CPU 171, to form a purchase detection subsystem. Similarly, a software component for determining that two users have a purchase notification relationship may operate with the CPU 171 and persistent storage device 173 to form a purchase notification relationship subsystem. As another example, a notification subsystem may be composed of hardware components such as the CPU 171 and connected through networking hardware to the Internet 140 as well as software components such as a module for providing notifications to a customer that a purchasing user has purchased an item. These groupings are provided as examples, and those of ordinary skill in the art will recognize that the facility may be composed in many other ways.

Figure 2:
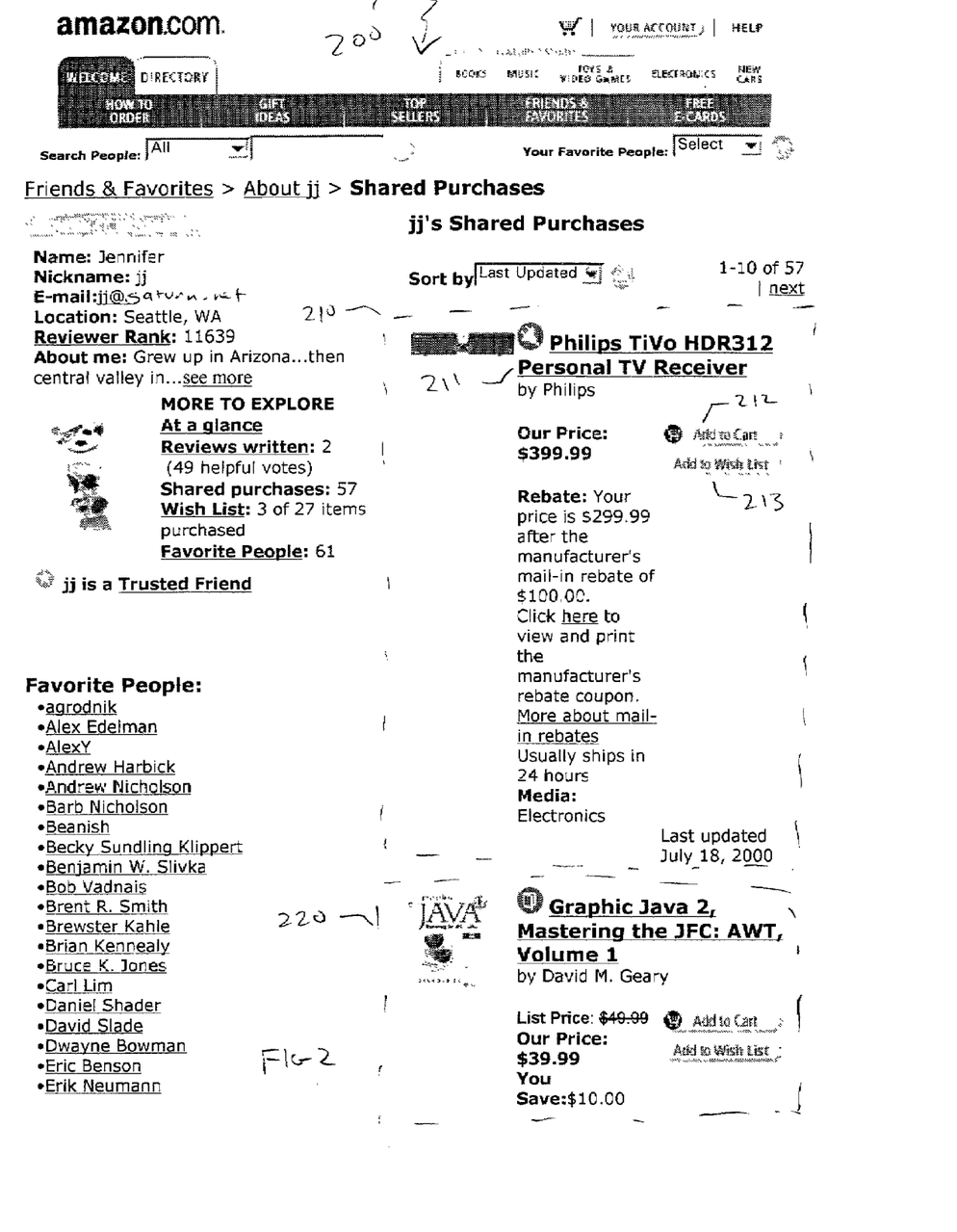
FIG. 2 is a display diagram showing a first portion of a shared purchases Web page for a sharing user whose nickname is "jj."

FIGS. 2-5 show examples of how the facility displays to a user information about purchases made by other users. FIG. 2 is a display diagram showing a first portion of a shared purchases Web page for a sharing user whose nickname is "jj." This Web page lists some or all of the purchases made by the user jj that this user has elected to share. Display 200 which shows a first portion of this Web page contains information about two shared purchases 210 and 220. In each case, the information about the purchase includes the name of the purchased product, which is typically a link to another page containing more extensive information about the product, as is product name 211. The information about a product may also include such information as a picture of the product, the type of the product, the name of the product, the manufacturer of the product, the price of the product, a description of the product, purchase terms of the product, an artist who created the product, purchase terms for the product, as well as information of a variety of other types. The information about a purchased product may contain various other controls, such as an add to cart button like button 212 for adding the product to a shopping cart, or an add to wish list button for adding the product to a wish list like button 213. Various other controls may also be included, such as a one-click purchase button (not shown) for immediately purchasing the product without further interaction.

Figure 3:
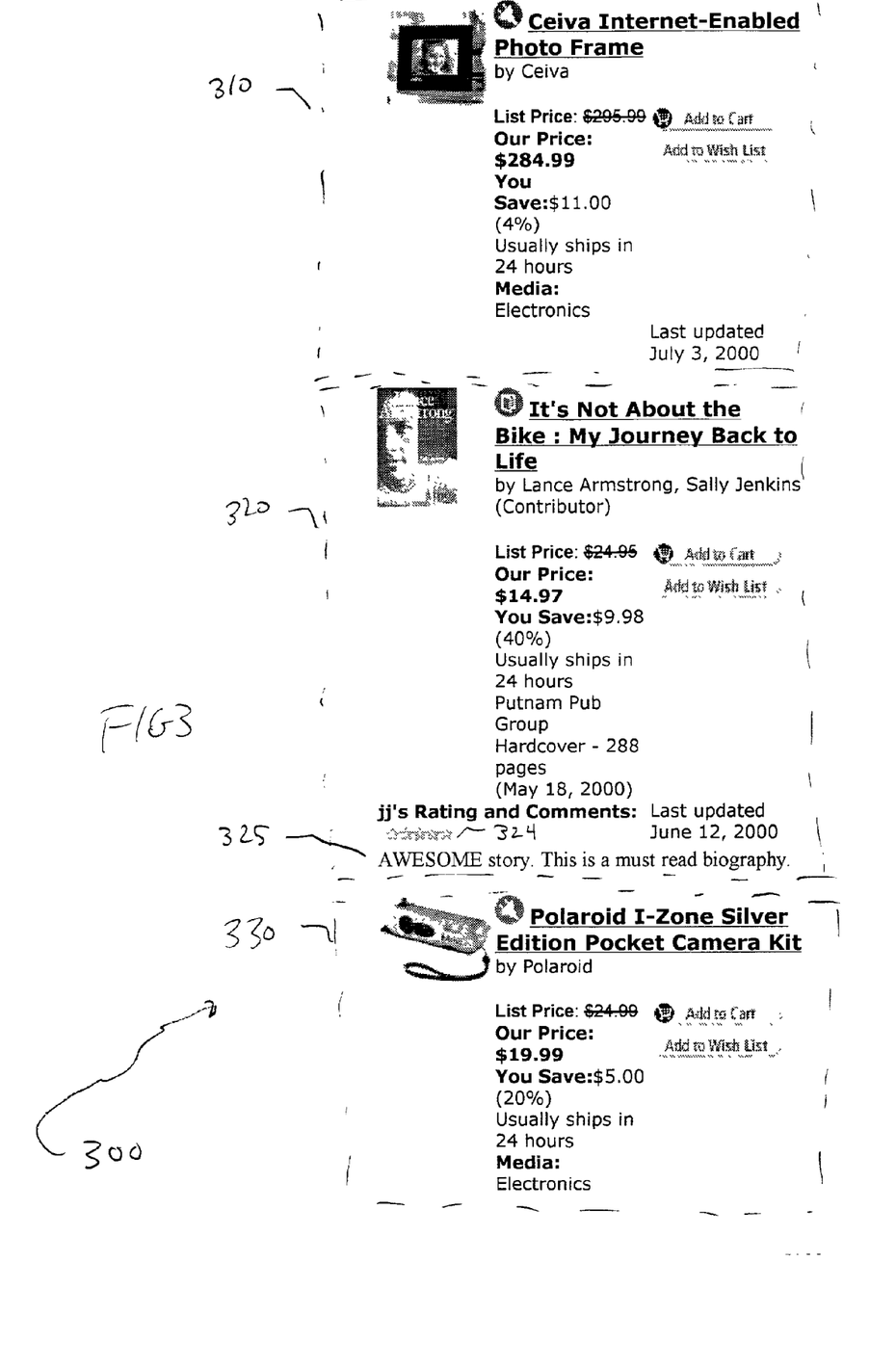
FIG. 3 is a display diagram showing a subsequent portion of the shared purchases Web page shown in FIG. 2.

FIG. 3 is a display diagram showing a subsequent portion of the shared purchases Web page shown in FIG. 2. The display 300 shows additional products purchased and shared by the user jj. The display shows information about three additional products 310, 320, and 330. Information about product 320 includes feedback from the user jj, including a rating 324 in a star rating system assigned by the user jj, and a description 325 authorized by the user jj. This information is generally generated by the purchasing user to assist those users who review the shared purchase in determining whether they are interested in purchasing the purchased product. This feedback on the product is different from the other kinds of information about a product that the merchant can provide, in that (a) it is clearly from the identified user, as opposed to a professional marketer, and (b) it reflects the individual style of the user that prepares it. These factors make it more likely in many cases that this form of user feedback will be given greater weight by other purchasers and lead to additional sales that otherwise would not have been produced by displaying other information about the product. In addition, acquaintances of the purchasing user may read this feedback from the purchasing user as a sort of communication from the purchasing user. Other users not acquainted with the purchasing user may read this feedback as a sort of literature. In both cases, these ways of regarding feedback from the purchasing user contribute to the stickiness of the merchant Web site.

Figure 4:
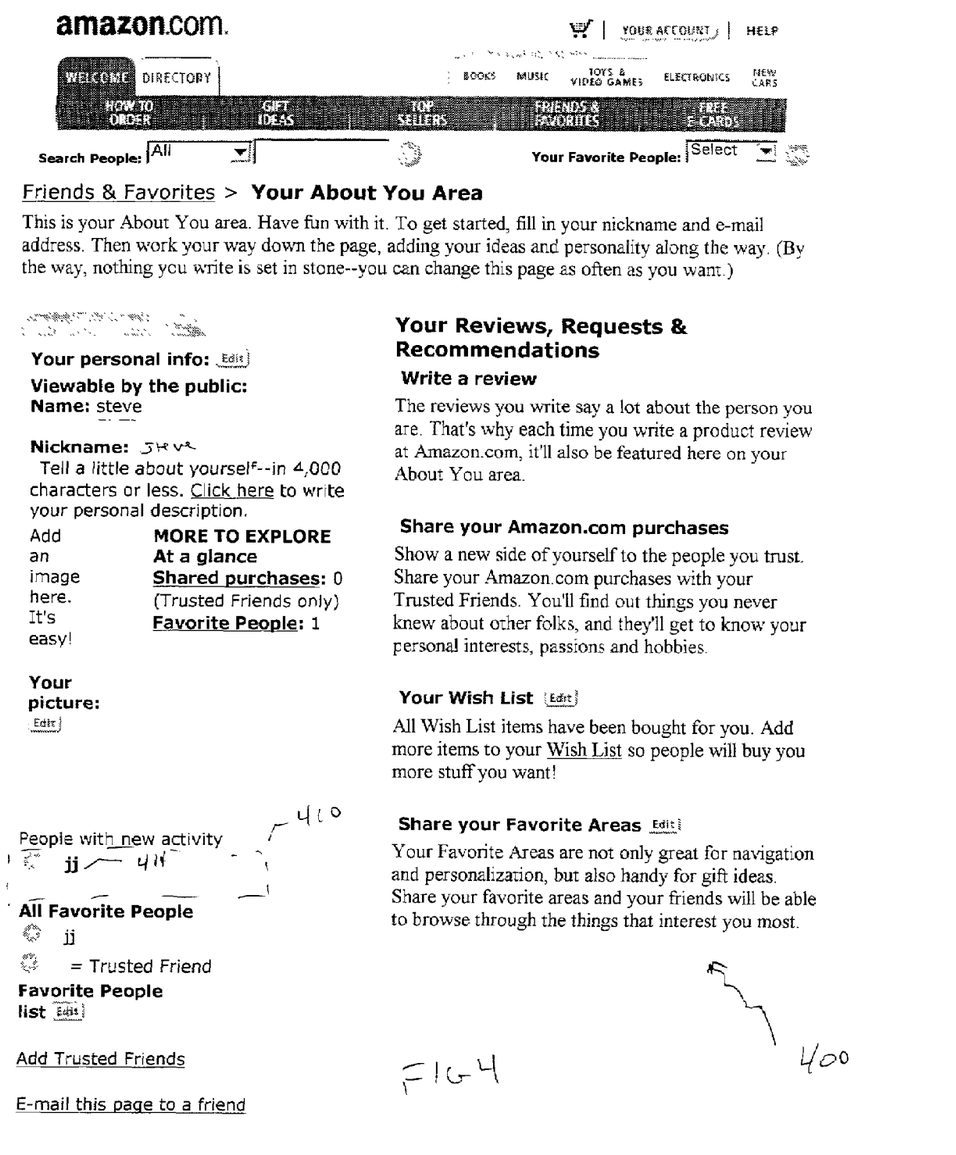
FIG. 4 is a display diagram showing a "Friends and Favorites" Web page for a user other than jj.

FIG. 4 is a display diagram showing a "Friends and Favorites" Web page for a user other than jj. This user, "Steve," has a purchase information sharing relationship with the user jj. In the parlance of the display 400, jj is a favorite person and trusted friend of the user Steve. Accordingly, the Friends and Favorites Web page for the user Steve contains an indication 410 that the user jj has recently performed additional activity, such as a detected purchase, that is shared with her trusted friends and favorite people. The indication includes a link 411 that can be traversed to the shared purchaser's Web page for the user jj shown in FIGS. 2 and 3. In this way, users who have a purchase information sharing relationship with the user jj can discover and read about the user jj's recent purchases and/or recently-shared purchases.

Figure 5:
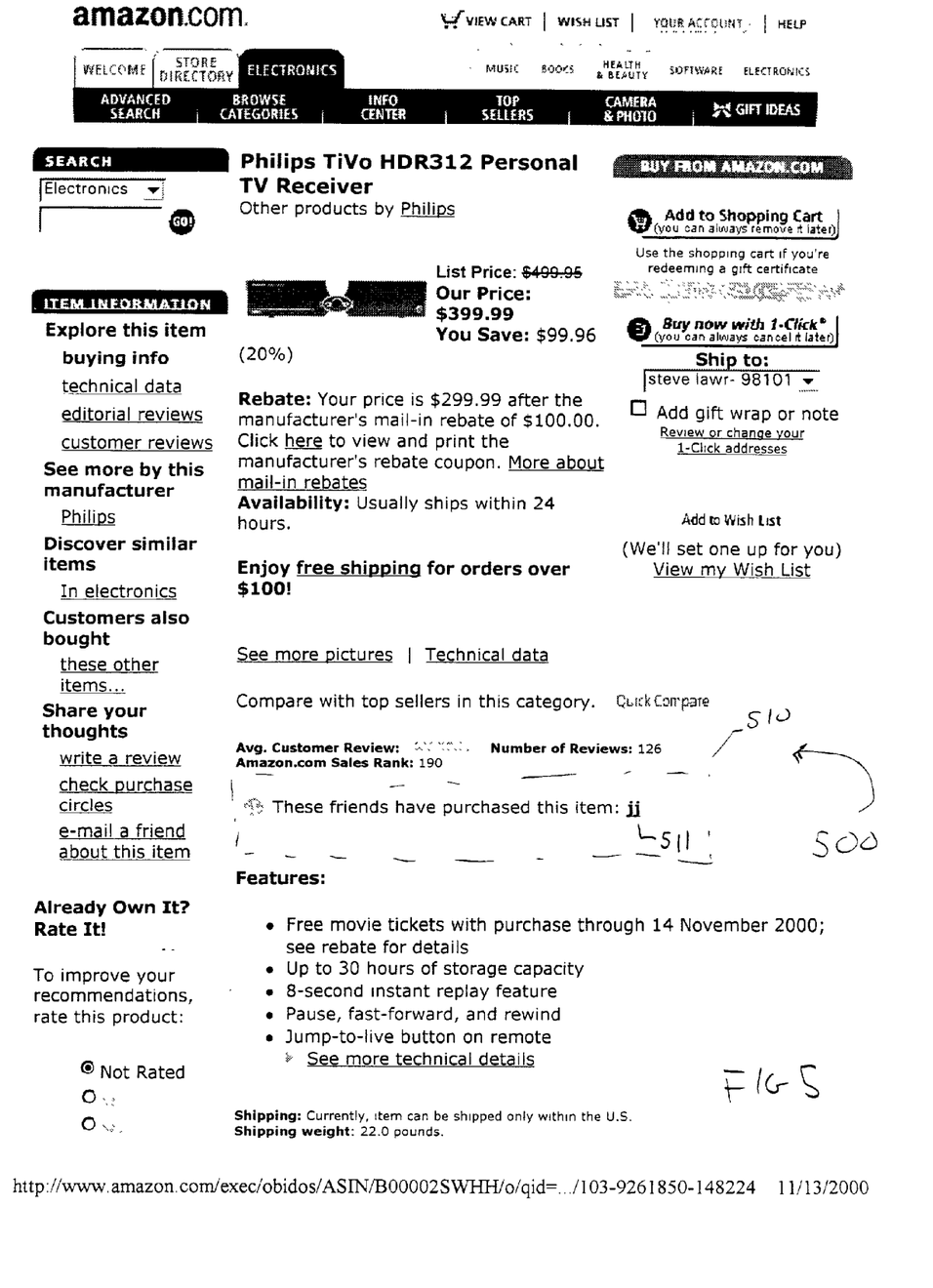
FIG. 5 is a display diagram showing a product description Web page.

FIG. 5 is a display diagram showing a product description Web page. Display 500, in addition to a variety of other types of information about the product and controls for purchasing the product, includes a display 510 of other users who have purchased the product. The display 510 contains an indication 511 that jj has purchased the product. The indication identifies jj as the purchaser and notifies users that have a purchase notification relationship with jj that jj has purchased the item. The indication 511 is a link to the portion of the shared purchases Web page for the user jj that contains information about this product. In alternative embodiments, the indication 511 could contain additional information, such as any of the information shown on the shared purchases Web page for the purchasing user. By displaying this information on product description Web pages throughout the merchant Web site, the facility is able to deliver shared purchase information even to users that aren't aware of the shared purchases feature, or who fail to specifically seek it out. In many senses, if a user is considering the purchase of the product described in a product description Web page, an indication that the user's friends, whose judgment the user trusts, have already purchased the item may be a significant factor in influencing the user to purchase the product. Further, such indications on product description Web pages can serve to introduce or reintroduce the user to the shared purchases feature. In this case, the user may go on to investigate other shared purchases of this sharing user or other users.

Shared purchase information may be conveyed in a variety of other ways, including displaying purchase information on various other Web pages, sending users various types of electronic messages, or sending a postal letter to users, for example.

Figure 6:
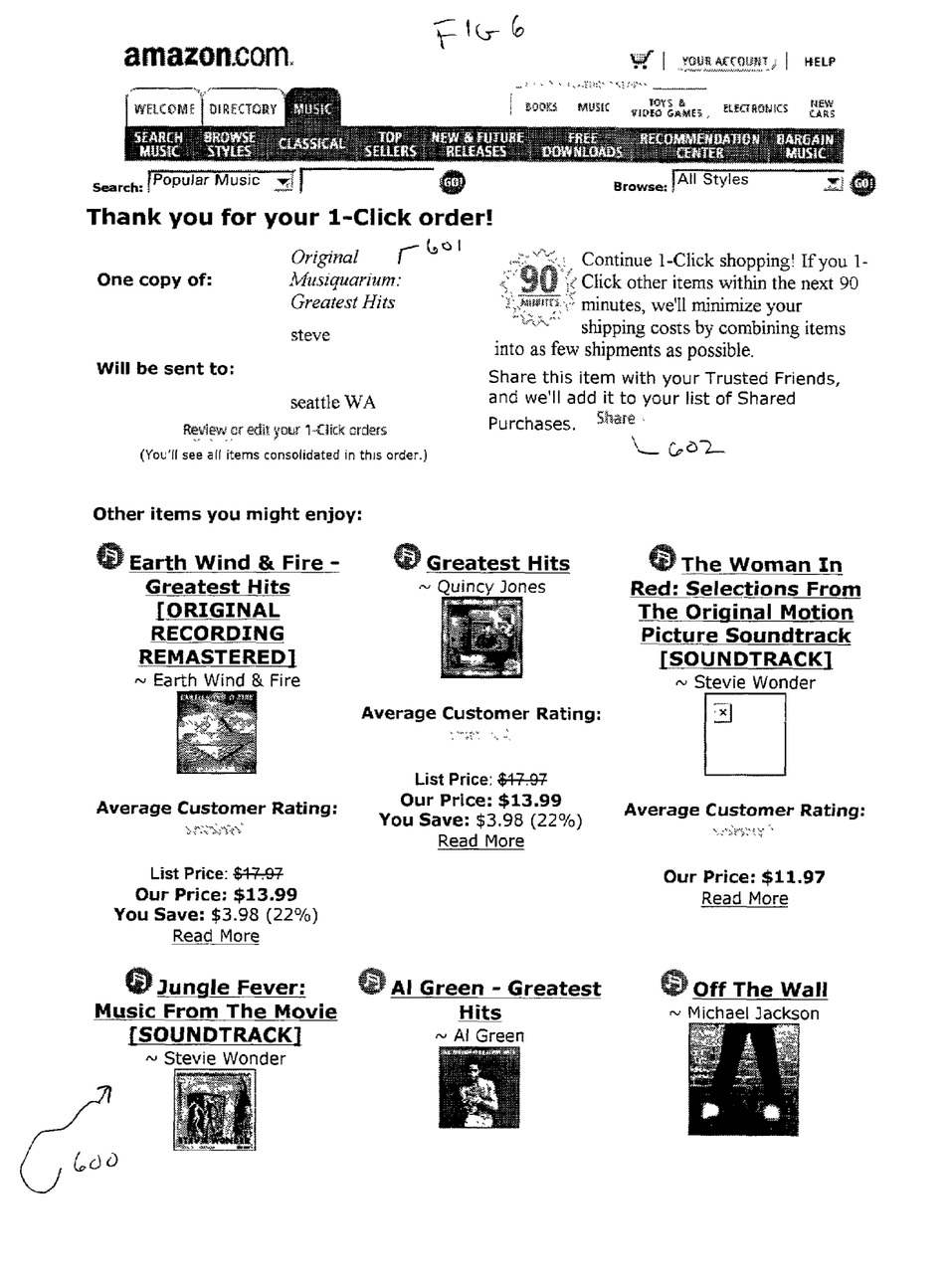
FIG. 6 is a display diagram showing a display produced in response to an order by the user Steve for a product.
Figure 7:
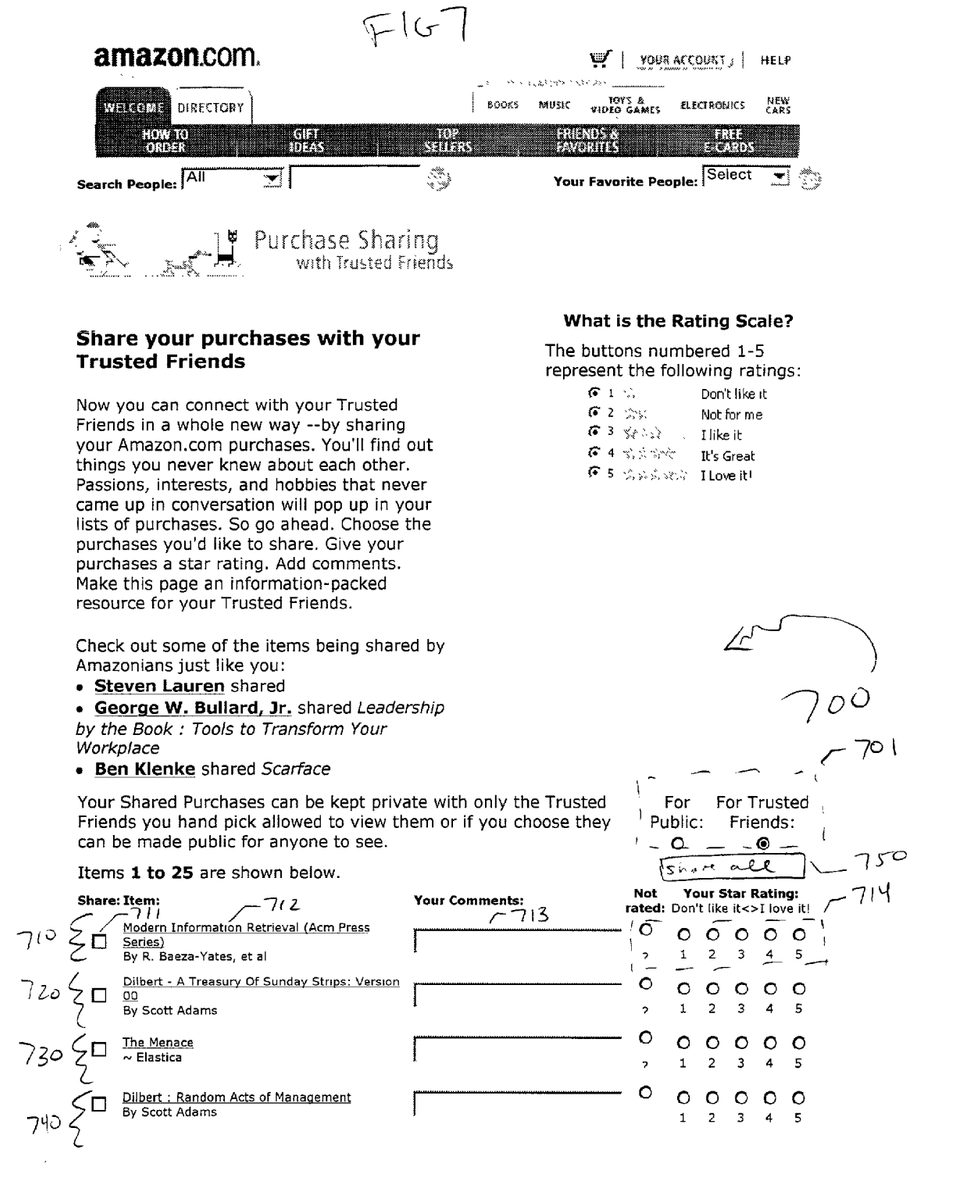
FIG. 7 is a display diagram showing a display usable by a user to share and offer feedback on past purchases.

FIGS. 6-7 show examples of how a purchasing user may share information about the purchase of a product. FIG. 6 is a display diagram showing a display produced in response to an order by the user Steve for a product, such as after detecting that Steve has purchased the product. The display 600 shows the name 601 of the product, as well as a share button 602 that the user may click in order to designate the product for purchase sharing. As is discussed in more detail below, the display 600 may in some embodiments include additional controls for specifying a group of users with which to share information about the purchase, and for providing feedback (at least preliminary feedback) about the product as part of the shared information.

FIG. 7 is a display diagram showing a display usable by a user to share and offer feedback on past purchases. The display 700 contains a row for each of a number of past purchases, such as rows 710, 720, 730, and 740. Any of these purchases may be shared with either all users, or users with whom this user has special purchase information sharing relationships. The user uses radio button 701 to select either all users or users with whom the user has purchase information sharing relationships ("trusted friends"). In alternative embodiments, the user may designate other groups with which to share purchase information, including groups earlier defined by the user, groups dynamically defined by the user, groups defined by someone other than the user, groups that other users themselves opt into, and groups automatically generated, such as groups in which all of the users share some set of characteristics, including such characteristics as items purchased, shopping pattern, geographical location, or any other information collected from or about users.

To share a particular purchase, the user checks the checkbox for the purchase, and optionally may add feedback about the purchase. For example, to share information about the purchase of the *Modern Information Retrieval* book shown in row 710, the user checks checkbox 711, and may also type comments in comments field 713, and select one of the product rating radio buttons 714. If the user wishes to share all of the products in the list, the user may click share all button 750 rather than checking each of the checkboxes.

Instructions for sharing purchases may be issued in a variety of other ways. For example, in some embodiments, a user may set a persistent "always share" flag in order to share information about each purchase as purchases are made. In one embodiment, this flag may be toggled on and off by the user in order to set the default behavior for automatically sharing each purchase as it is made. In another embodiment, such a flag may be permanently set for "celebrity shoppers" with whom the merchant reaches an agreement to shop at the merchant and share information about their purchases with other users.

Also, embodiments of the facility support sharing information about purchases made from other merchants, as well as purchases made by people other than the sharing user. For example, the facility preferably enables a user, when viewing information about a particular product, to indicate that the user already owns the product. When the user indicates that he or she already owns the product, the facility preferably prompts the user to indicate whether the user's purchase of the product should be shared with other users. Additional embodiments of the invention enable a user to share information about a product purchased on that user's behalf by someone else. For example, where a first user purchases a product as a gift for a second user, the second user may determine whether information about that purchase should be shared with other users. The second user may make this determination by any of the mechanisms described above. Alternatively, the facility may send the second user an email message indicating that the item has been purchased for the second user in soliciting a determination by return email of whether information about the purchase should be shared with other users. In some cases, such as where the "always share" flag is set for the second user, or where the product was purchased by the first user from a publicly-viewable wish list generated by the second user, such purchases are automatically shared with other users.

Figure 8:
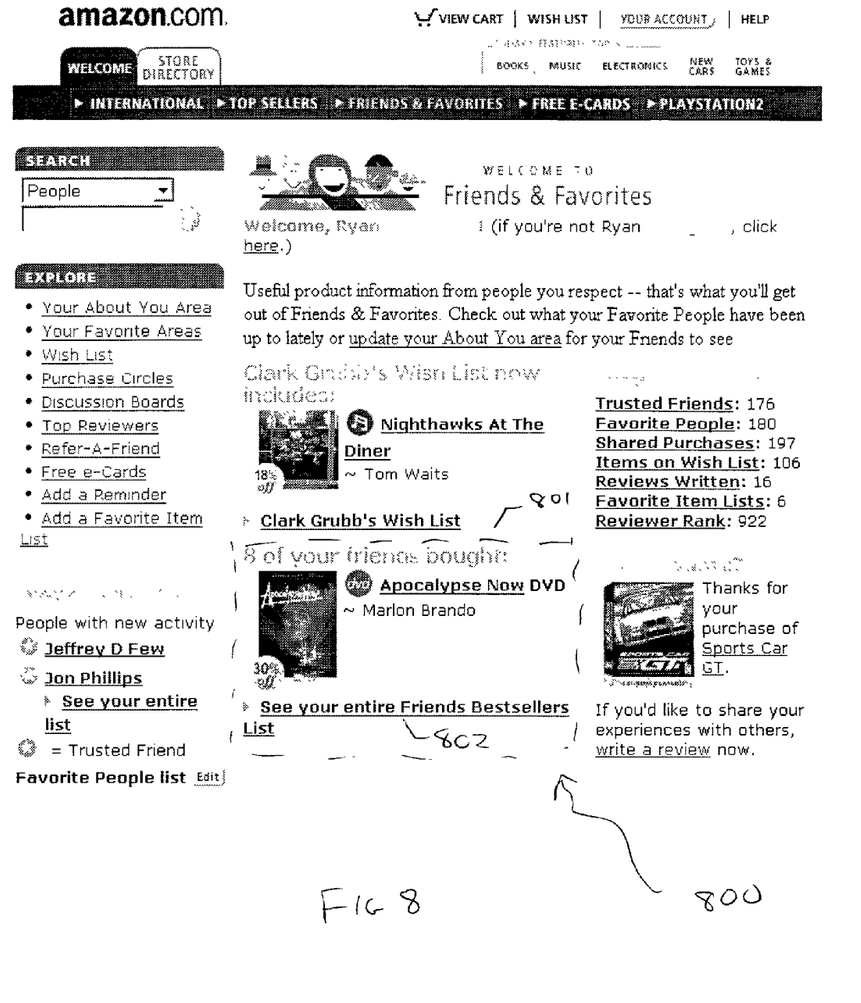
FIG. 8 is a display diagram showing a display showing a page for a user "Ryan" referencing the friends best sellers list for the user Ryan.

FIG. 8 is a display diagram showing a display showing a page for a user "Ryan" referencing the friends best sellers list for the user Ryan. The display 800 includes information 801 about this friends best sellers list for the user Ryan. The information includes a link 802 to the friends best sellers list for the user Ryan.

Figure 9:
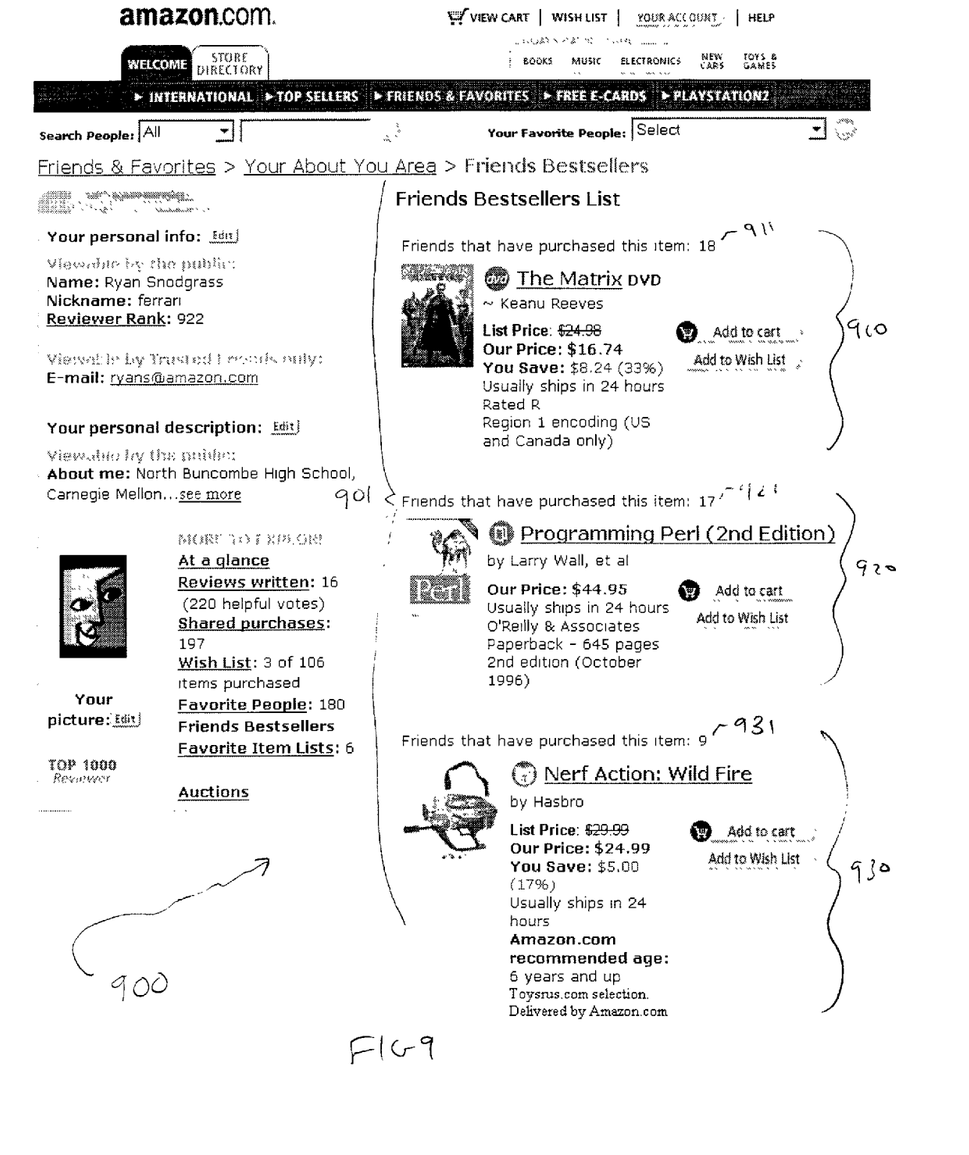
FIG. 9 is a display diagram showing the contents of the friends best sellers list for the user Ryan.

FIG. 9 is a display diagram showing the contents of the friends best sellers list for the user Ryan. The display 900 includes friends best sellers list 901. The friends best sellers list includes information about each of a number of products purchased by other users with which the user Ryan has a purchase information sharing relationship. For example, information 910 relates to a "The Matrix DVD" product purchased by users with whom the user Ryan has a purchase information sharing relationship. Among this information is a count 911 of the number of such users that have purchased this product. The list 901 preferably sorted in the descending order of this count. Similarly information 920 relates to a "Programming Perl" product and information 930 relates to a "Nerf Action: Wild Fire" product purchased by users that have a purchase notification relationship with the user Ryan. Each of these products includes a count 921 and 931 of the number of such users that have purchased the product.

It will be understood by those skilled in the art that the above-described facility could be adapted or extended in various ways. For example, the facility may be implemented and/or operated by parties other than a Web merchant. The facility may also display information about purchases made from a variety of different Web merchants, and from merchants other than Web merchants. A facility may utilize a wide variety of different ways to authorize the sharing of purchase information, to define and select groups of users with whom different types and quantities of purchase information is shared, and to actually share purchase information. While the foregoing description makes reference to preferred embodiments, the scope of the invention is defined solely by the claims that follow and the elements recited therein.

We claim:

1. A method for notifying a notified customer about a purchase made by a purchasing customer, comprising:
   in a computing system, detecting that the purchasing customer has purchased an item for a person other than the notified customer, wherein the notified customer is not a party to the purchase transaction;
   in the computing system, determining that the notified customer has a purchase notification relationship with the purchasing customer; and
   via the computing system, providing to the notified customer a notification that the purchasing customer has purchased the item, the notification identifying the purchasing customer and including a link to additional information regarding the purchasing customer's purchase.

2. The method of claim 1 wherein a notification that the purchasing customer has purchased the item is provided to the notified customer by displaying a visual indication of the purchase on a Web page requested by the notified customer.

3. The method of claim 1 wherein a notification that the purchasing customer has purchased the item is provided to the notified customer by sending a message to the notified customer.

4. The method of claim 3 wherein the sent message is an electronic mail message.

5. The method of claim 3 wherein the sent message is an instant message.

6. The method of claim 3 wherein the sent message is a pager message.

7. The method of claim 3 wherein the sent message is a snail mail message.

8. The method of claim 3 wherein the sent message is a voice mail message.

9. The method of claim 1, further comprising establishing for the notified customer a purchase notification relationship with the purchasing customer in response to an instruction from the purchasing customer.

10. The method of claim 1, further comprising establishing for the notified customer a purchase notification relationship with the purchasing customer in response to an instruction from the notified customer.

11. The method of claim 1, further comprising establishing for the notified customer a purchase notification relationship with the purchasing customer in response to a comparison of characteristics of the notified and purchasing customers.

12. The method of claim 1 wherein the notification is only provided in response to authorization from the purchasing customer with respect to the item.

13. The method of claim 1 wherein the notification includes a control for obtaining additional information about the product.

14. The method of claim 1 wherein the notification includes a control for purchasing the product.

15. The method of claim 1 wherein the detecting comprises receiving an order from the purchasing customer for the item.

16. The method of claim 1 wherein the detecting comprises receiving an order from a third customer ordering the item as a gift for the purchasing customer.

17. The method of claim 1 wherein the detecting comprises receiving input from the purchasing customer indicating that the purchasing customer owns the item.

18. A computer-readable medium whose contents cause a computing system to notify a notified customer about a purchase made by a purchasing customer, by a method comprising:
   in the computing system, detecting that the purchasing customer has purchased an item for a recipient other than the notified customer, wherein the notified customer is not a party to the purchase transaction;
   in the computing system, determining that the notified customer has a purchase notification relationship with the purchasing customer; and
   via the computing system, providing to the notified customer a notification that the purchasing customer has purchased the item, the notification identifying the purchasing customer and including a link to additional information regarding the purchasing customer's purchase.

19. A computing system for notifying a notified customer about a purchase made by a purchasing customer, comprising:
   a processor and memory together comprising:
   a purchase detection subsystem that detects that the purchasing customer has purchased an item for a recipient other than the notified customer, wherein the notified customer is not a party to the purchase transaction;
   a purchase notification relationship subsystem that determines that the notified customer has a purchase notification relationship with the purchasing customer; and
   a notification subsystem that provides to the notified customer a notification that the purchasing customer has purchased the item, the notification identifying the purchasing customer and including a link to additional information regarding the purchasing customer's purchase.

20. The computing system of claim 19 wherein the recipient is the purchasing customer.

* * * * *